(12) United States Patent
Manasse et al.

(10) Patent No.: US 11,343,094 B2
(45) Date of Patent: May 24, 2022

(54) METHODS AND SYSTEMS FOR ENCRYPTING SHARED INFORMATION THROUGH ITS LIFECYCLE

(71) Applicant: i2Chain, Inc., San Ramon, CA (US)

(72) Inventors: Mark Steven Manasse, San Francisco, CA (US); Sanjay Jain, Sammamish, WA (US); Ajay Jotwani, San Ramon, CA (US)

(73) Assignee: I2Chain, Inc., San Ramon, CA (US)

( * ) Notice: Subject to any disclaimer, the term of this patent is extended or adjusted under 35 U.S.C. 154(b) by 145 days.

(21) Appl. No.: 16/932,698

(22) Filed: Jul. 17, 2020

(65) Prior Publication Data

US 2021/0218570 A1 Jul. 15, 2021

Related U.S. Application Data

(60) Provisional application No. 62/960,638, filed on Jan. 13, 2020.

(51) Int. Cl.
| | |
|---|---|
| *H04L 9/16* | (2006.01) |
| *G06F 21/78* | (2013.01) |
| *G06F 21/60* | (2013.01) |
| *G06F 21/62* | (2013.01) |
| *G06F 16/93* | (2019.01) |
| *H04L 9/08* | (2006.01) |

(52) U.S. Cl.
CPC ............. *H04L 9/16* (2013.01); *G06F 16/93* (2019.01); *G06F 21/602* (2013.01); *G06F 21/6209* (2013.01); *G06F 21/78* (2013.01); *H04L 9/0861* (2013.01); *G06F 2221/2141* (2013.01)

(58) Field of Classification Search
CPC ......... H04L 9/16; H04L 9/0861; G06F 16/93; G06F 21/602; G06F 21/6209; G06F 21/78; G06F 2221/2141
See application file for complete search history.

(56) References Cited

U.S. PATENT DOCUMENTS

| | | | |
|---|---|---|---|
| 9,654,450 B2 * | 5/2017 | Ford | ........................ H04L 63/08 |
| 10,523,423 B2 | 12/2019 | Lim et al. | |
| 10,693,634 B2 | 6/2020 | An et al. | |

(Continued)

*Primary Examiner* — Jung W Kim
*Assistant Examiner* — Alan Lingqian Kong
(74) *Attorney, Agent, or Firm* — Kanika Radhakrishnan; Evergreen Valley Law Group

(57) ABSTRACT

Methods and systems for encrypting shared information through its life cycle are described. The method includes receiving and storing a document. The method further includes encrypting document using a primary key. Further, the method includes receiving sharing request from current user of document for sharing document with a next user. The method includes, for each time the document is to be shared with next user in a series, generating a key for next user specified in sharing request. The method further includes encrypting document for next user using key generated for corresponding next user. Furthermore, the method includes binding access rights to document for authorizing request to access document by next user. The method includes sharing encrypted document with next user. Thereafter, the method includes receiving a request to access the document from the next user and providing the access to encrypted document meant for next user to next user.

16 Claims, 8 Drawing Sheets

(56) References Cited

U.S. PATENT DOCUMENTS

| | | | |
|---|---|---|---|
| 2008/0292103 A1 | 11/2008 | Lee et al. | |
| 2013/0067239 A1* | 3/2013 | Gupta | H04L 63/0428 713/189 |
| 2014/0270178 A1* | 9/2014 | Kiang | H04L 9/0822 380/281 |
| 2016/0149875 A1* | 5/2016 | Li | H04L 63/0478 713/168 |
| 2017/0180476 A1* | 6/2017 | Rudrawar | G06F 16/23 |
| 2018/0062852 A1* | 3/2018 | Schmahmann | H04L 9/14 |
| 2018/0314847 A1* | 11/2018 | Yeo | H04L 9/0894 |
| 2020/0136812 A1 | 4/2020 | Lim et al. | |

\* cited by examiner

METHODS AND SYSTEMS FOR ENCRYPTING SHARED INFORMATION THROUGH ITS LIFECYCLE

TECHNICAL FIELD

Embodiments of the disclosure relate generally to a field of cryptography and, more particularly to, methods and systems for encrypting shared information through its lifecycle.

BACKGROUND

Currently, use of network-based computing and storage is proliferated. The network-based storage has enabled users and organizations alike to forego the infrastructure costs associated with establishing on-premises data storage solutions. Instead, users and organizations are increasingly migrating to network-based storage solutions as network-based storage solutions require small or negligible set-up costs. Additionally, data access in network-based storage is facilitated to members of an organization who may be located at various geographical locations, thus helping the members in storing documents easily and sharing the documents when needed.

The network-based storage systems may require access control policies to be specified for each document that is stored in the storage systems. The access control policies may dictate a level of access that an organization member is granted for a document. The access control policies and the documents stored in the network-based storage systems may require to be encrypted for securely protecting the data stored in the documents and eliminating the risk of data tempering as documents are generally shared among multiple members. Conventionally, for secure sharing of a document, a single key is initially used to encrypt the document. With single key use, it is a constant test to ensure that the key never reaches a stable storage and is appropriately protected from illegitimate access. Furthermore, it is also challenging to ensure that the document remains protected even after being copied to a member device.

In light of the above discussion, there is a need for methods and systems that ensure consistency in rendering the encrypted documents to authorized recipients only while reducing the chances of data tempering.

SUMMARY

Various embodiments of the present disclosure provide methods and systems for encrypting shared information through its lifecycle.

In an embodiment, a method is disclosed. The method includes receiving a document to be stored. The method includes storing the document. The method includes encrypting the document using a primary key. The method includes receiving a sharing request from a current user of the document for sharing the document with a next user. The method includes, for each time the document is to be shared with the next user in a series, generating a key for the next user specified in the sharing request. The method includes encrypting the document for the next user using the key generated for the corresponding next user. The method includes binding access rights to the document for authorizing the request to access the document by the next user. The method includes sharing the encrypted document with the next user. The method includes receiving a request to access the encrypted document from the next user. The method further includes providing the access to the encrypted document meant for the next user to the next user.

In an embodiment, a method is disclosed. The method includes receiving a document to be stored. The method includes storing the document. The method includes encrypting the document using a primary key. The method includes receiving a sharing request from a current user of the document for sharing the document with a next user. The method includes, for each time the document is to be shared with the next user in a series, generating a key for the next user specified in the sharing request. The method includes encrypting the document for the next user using the key generated for the corresponding next user. The method includes binding access rights and a sharing path to the document for authorizing the request to access the document by the next user. The sharing path includes sequence information about one or more next users and one or more intermediate users with whom the document is being shared in the series. The method includes sharing the encrypted document with the next user. The method includes receiving a request to access the encrypted document from the next user. The method further includes providing the access to the encrypted document meant for the next user to the next user.

In yet another embodiment, a system is disclosed. The system includes a memory to store instructions and a processor to execute the stored instructions in the memory and thereby causing the system at least in part to receive a document to be stored. The system is further configured to encrypt the document using a primary key. The system is further configured to receive a sharing request from a current user of the document for sharing the document with a next user. The system is further configured to generate a key for the next user specified in the sharing request when each time the document is to be shared with the next user in a series. The system is further configured to encrypt the document for the next user using the key generated for the corresponding next user. The system is further configured to bind access rights to the document for authorizing the request to access the document by the next user. The system is further configured to share the encrypted document with the next user. The system is further configured to receive a request to access the encrypted document from the next user. The system is further configured to provide the access to the encrypted document meant for the next user to the next user.

In yet another further embodiment, a system is disclosed. The system includes an input-output module, an encryption-decryption management module, a storage module and a processing module. The input-output module is configured to receive one or more documents to be stored and to facilitate viewing of the one or more documents. The encryption-decryption management module is in communication with the input-output module. The encryption-decryption management module is configured to perform encryption and decryption of the one or more documents for facilitating secured sharing of the one or more documents in a series. The storage module is in communication with the input-output module and the encryption-decryption management module. The storage module is configured to store the one or more documents and one or more keys that are used for performing encryption and decryption of the one or more documents. The processing module is in communication with the input-output module, the encryption-decryption management module and the storage module. The processing module is configured to send operating instructions to the input-output module, the encryption-decryption management module and the storage module for facilitating secured access of the one or more documents stored in the system.

BRIEF DESCRIPTION OF THE FIGURES

For a more complete understanding of example embodiments of the present technology, reference is now made to the following descriptions taken in connection with the accompanying drawings in which.

Figure 1:
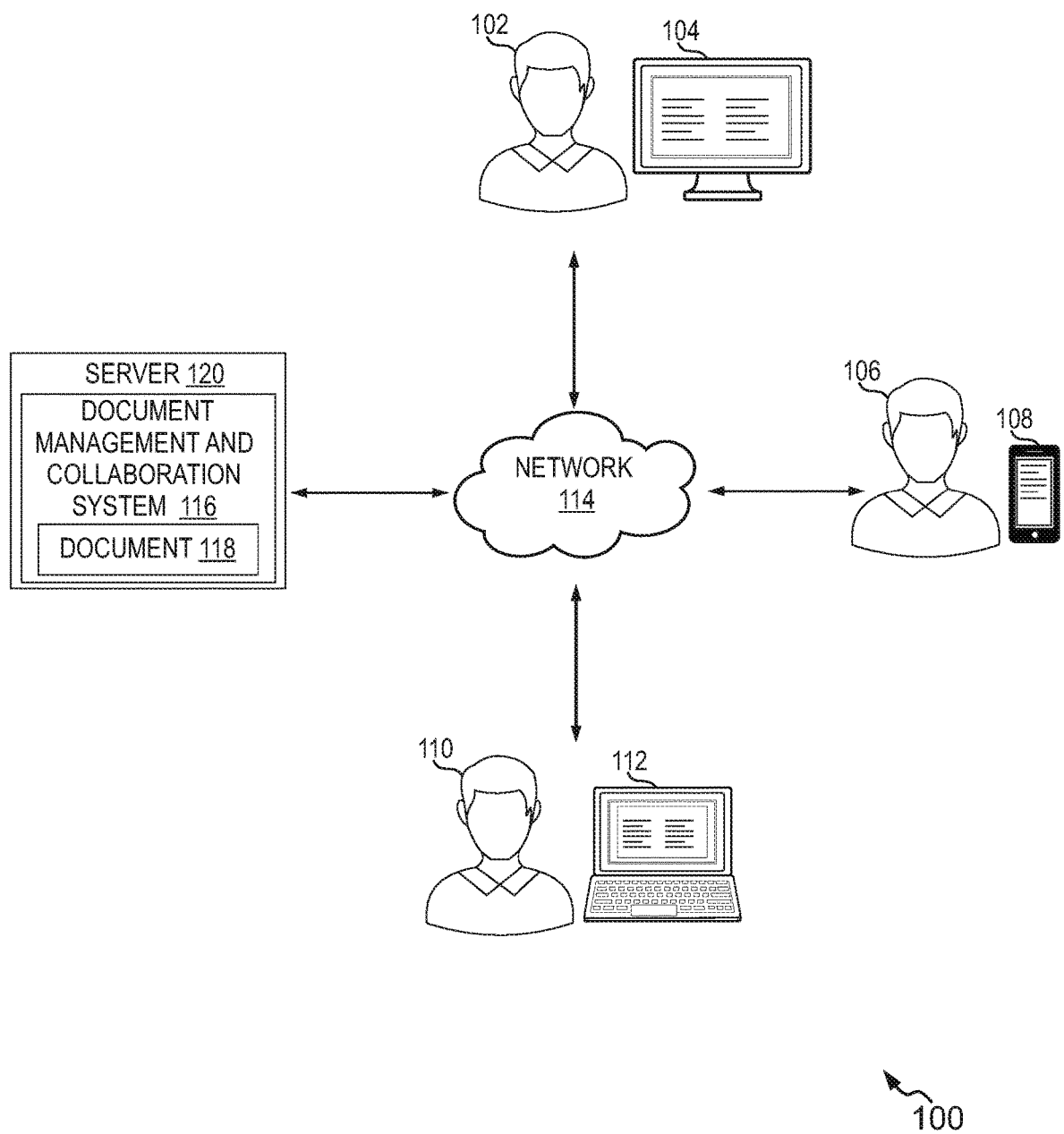
FIG. 1 is an illustration of an environment, where at least some example embodiments can be practiced.

The drawings referred to in this description are not to be understood as being drawn to scale except if specifically noted, and such drawings are only exemplary in nature.

DETAILED DESCRIPTION

In the following description, for purposes of explanation, numerous specific details are set forth in order to provide a thorough understanding of the present disclosure. It will be apparent, however, to one skilled in the art that the present disclosure can be practiced without these specific details. In other instances, systems and methods are shown in block diagram form only in order to avoid obscuring the present disclosure.

Reference in this specification to "one embodiment" or "an embodiment" means that a particular feature, structure, or characteristic described in connection with the embodiment is included in at least one embodiment of the present disclosure. The appearance of the phrase "in one embodiment" in various places in the specification is not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

Moreover, although the following description contains many specifics for the purposes of illustration, anyone skilled in the art will appreciate that many variations and/or alterations to said details are within the scope of the present disclosure. Similarly, although many of the features of the present disclosure are described in terms of each other, or in conjunction with each other, one skilled in the art will appreciate that many of these features can be provided independently of other features. Accordingly, this description of the present disclosure is set forth without any loss of generality to, and without imposing limitations upon, the present disclosure.

Overview

Various example embodiments of the present disclosure provide methods and systems for encrypting shared information through its lifecycle.

A document management and collaboration system is provided for encrypting shared information through its life cycle. The document management and collaboration system is configured to remotely store documents and permit multiple users belonging to a variety of organizations to share and collaborate on documents.

For authenticating access to the document stored in the document management and collaboration system, the document management and collaboration system generates and allocates a key for each sharing action that needs to be performed on the document in a series for secured sharing of the document in the series. The document management and collaboration system may encrypt the stored document before sharing the document using a primary key. Once a user sends a request to share a document with a next user, the document management and collaboration system generates a key for the next user. The generated key is to be used for performing the encryption of the encrypted document before providing access of the document to the next user. Access rights are also bound to the documents for authorizing the request to access the document received from the other users.

The document management and collaboration system may further perform multiple decryptions of the encrypted document in a series using the key generated for the next user to produce the un-encrypted document that is to be provided to the next user. The document management and collaboration system may also use a shared path compression technique for encrypting shared information through its life cycle. In the shared path compression technique, a sharing path is also added to the document before encrypting the document and the access rights for each user are embedded in the sharing path. The sharing path includes sequence information about one or more next users and one or more intermediate users with whom the document is being shared in the series. Further, one or more compressed paths are created from the sharing path and a key is generated for each compressed path. The compressed paths are direct paths created between the two users by eliminating intermediate users, and the users on the compressed paths are recorded so that future revocations of access to the users along the compressed path can be detected and used to revoke access to the users whose privileges depend on the users compressed away from the encryption sequence.

The document is encrypted using the key prepared for the particular compressed path to generate double encrypted document. The double encrypted document is further shared with the user included in the corresponding compressed path. The use of the shared path compression technique eliminates the need of performing multiple decryptions for providing access of the document to the next user.

FIG. 1 is an illustration of an environment 100 related to at least some example embodiments of present disclosure. The environment 100 includes, but is not limited to, a wireless communication network (e.g., a network 114) that connects entities such as users 102, 106 and 110 and a server 120. The users 102, 106 and 110 are depicted to be associated with electronic devices 104, 108 and 112 (hereinafter referred to as 'user device 104, user device 108 and user device 112', respectively). The user devices 104, 108 and 112 may be capable of being connected to the wireless communication network (such as the network 114). Examples of the user devices 104, 108 and 112 include a mobile phone, a smart telephone, a computer, a laptop, a Personal Digital Assistant (PDA), a Mobile Internet Device (MID), a tablet computer, an Ultra-Mobile personal computer (UMPC), a phablet computer, a handheld personal computer and the like. The users 102, 106 and 110 may be a mortgage banker, mortgage broker and a credit rater, respectively, working for a mortgage company. It should be noted that three users are shown for the sake of simplicity; there can be more number of users.

In an embodiment, the server 120 may be maintained by a remote service provider. In at least one example embodiment, the server 120 can be a group of servers deployed on cloud. The server 120 is configured to manage a document management and collaboration system 116 and to communicate with devices, such as the user devices 104, 108 and 112 using the network 114. Examples of the network 114 include stand alone or a combination of a local area network (LAN), a wide area network (WAN), wireless, wired, any currently existing or to be developed network that can be used for communication. More specifically, an example of the network 114 can be the Internet which may be a combination of a plurality of networks.

In at least one example embodiment, a user (e.g., the user 102) can access the document management and collaboration system 116 for storing a document, such as a document 118. In an embodiment, the document 118 is a mortgage application. Examples of the document 118 include, but are not limited to, design & architecture documents, financial reports of a company, health report of a patient etc. The document 118 can be any type of content, such as audio-visual media, word document, audio file, video file. In some embodiments, the document 118 can be a computer file that is capable of being rendered by a computer program for viewing by the user. The user can also access the document management and collaboration system 116 for performing one or more actions on the stored document. The one or more actions include, but are not limited to, downloading a copy of the document, viewing the document and modifying the document. Further, the user can also access the document management and collaboration system 116 for sharing the stored document with other users (e.g., the users 106 and 110).

The server 120 provides a software system, herein referred to as the document management and collaboration system 116. The document management and collaboration system 116 is configured to receive one or more documents and to remotely store the one or more documents, such as the document 118. The document management and collaboration system 116 is also configured to authenticate access to each document of the one or more documents. The document management and collaboration system 116 is further configured to permit a plurality of users, such as the users 102, 106 and 110 belonging to a same or a plurality of organizations to share and collaborate on the one or more documents. In an example embodiment, the plurality of users can access the document management and collaboration system 116 using an interface/portal/application (not shown in figures) supported by the server 120 for providing access to the document management and collaboration system 116. The interface/portal/application can be accessed using the user devices, such as the user devices 104, 108 and 112. In at least one example embodiment, the document management and collaboration system 116 is a web service and can be accessed through the web via the network 114. In another example embodiment, the document management and collaboration system 116 can be accessed through the web using the Internet. Additionally, the document management and collaboration system 116 is configured to retain access rights of the plurality of users, and maintain and preserve security of available rights for authorizing a received request for accessing the document.

The document management and collaboration system 116 is configured to generate and allocate a new key for each sharing action in a cascading order for ensuring secured sharing of a document (e.g., the document 118) along a sharing path. In an embodiment, the sharing path includes sequence information about the one or more users with whom the document is being shared in the series. The document management and collaboration system 116 may perform a plurality of decryptions along the sharing path to provide an un-encrypted original document. The plurality of decryptions is performed using keys of senders. The document management and collaboration system 116 may also bind access rights to the document for authorizing a request to access the document by a user for each sharing action to ensure that the enabled access permission of the document is not compromised or illegitimately used. Further, the document management and collaboration system 116 is configured to retain the access rights of a plurality of users, such as the users 102, 106 and 110, and maintain and preserve security of available access rights for authorizing an access request received for accessing one document.

In an example scenario, the user 102 may want to provide access of the document 118 stored in the document management and collaboration system 116 to the user 106. As the document 118 is being shared by the user 102 with the user 106, the user 102 became the current user of the document 118 and the user 106 became a next user to receive the document 118. For security purpose, the document 118 may be encrypted by the user 102 using a primary key. The user 102 may use the user device 104 for sending a sharing request of the document 118 to the server 120. Upon receiving the sharing request for the document 118, the document management and collaboration system 116 may generate a key for the next user i.e. the user 106 specified in the sharing request. The document management and collaboration system 116 may also encrypt the document 118 again using the key generated for the next user. Further, the document management and collaboration system 116 may update access rights of the document 118 for authorizing the request to access the document 118 by the next user. Additionally, the document management and collaboration system 116 may share the encrypted document 118 with the next user 106.

The next user i.e. the user 106 may send a request to the server 120 for accessing the document 118. Upon receiving the access request, the document management and collaboration system 116 may authorize the request received from the next user 106 using the access rights bound to the document 118. Upon successful authorization of the user 106, the document management and collaboration system 116 may provide the access of the encrypted document 118 to the user 106. The document management and collaboration system 116 may first decrypt the document 118 using the key that is used for encrypting the document and may then send a request to access the primary key to recover an original un-encrypted document from the encrypted document 118. Upon granting access to the primary key, the document management and collaboration system 116 may use the primary key to recover the un-encrypted document from the encrypted document 118. The recovered un-encrypted document can then be accessed by the next user 106.

The user 106 may further want to provide access of the document 118 to the user 110. The user 106 may use the user device 108 for sending a sharing request to the server 120. As the document 118 is now being shared by the user 106 to the user 110, the user 110 became the next user to receive the document 118. Upon receiving the sharing request for the document 118, the document management and collaboration system 116 may generate a key for the next user i.e. the user 110 specified in the sharing request. The document management and collaboration system 116 may also encrypt the document 118 again using the key generated for the next user i.e. the user 110. Further, the document management and collaboration system 116 may update access rights of the document 118 for authorizing the request to access the document by the next user. Additionally, the document management and collaboration system 116 may share the encrypted document 118 with the next user 110.

The next user i.e. the user 110 may send a request to the server 120 for accessing the document 118. Upon receiving the access request, the document management and collaboration system 116 may authorize the request received from the user 110 using the access rights bound to the document. Upon successful authorization of the user 110, the document management and collaboration system 116 may provide the access of the document 118 to the user 110. The document management and collaboration system 116 may perform a first decryption of the document 118 using key generated for the user 110 and may perform a second decryption of the document 118 using the key generated for the user 106, and may then send a request to the primary key to recover an original un-encrypted document from the encrypted document 118. Upon granting access to the primary key, the document management and collaboration system 116 may use the primary key to recover the un-encrypted document from the encrypted document 118. The recovered un-encrypted document can then be accessed by the user 110 using the user device 112.

In some embodiments, in order to improve performance and reduce time taken to retrieve the original document, the document management and collaboration system 116 may use a shared path compression technique for eliminating need of multiple decryptions. In shared path compression technique, the document management and collaboration system 116 may generate and allocate a new key to the sender's or predecessor's document after embedding access rights offered for each recipient in a sharing path of the resulting document. The addition of the access rights and sharing path may eliminate the need for multiple decryptions and also ensures that revocation of any access of any recipient consequently revokes access of other authorized recipients. For example, if a user named 'Alice' shares a document to another user named 'Bob', who then again shares the document with another user named 'Carl', so if 'Bob' loses access to the document, then 'Carl' should lose the access as well.

In an embodiment, in shared path compression technique, the document management and collaboration system 116 may generate a new key for a next user specified in a sharing request received from a current user of the document for sharing the document with the next user. The document management and collaboration system 116 may also bind an explicit sharing path to the document along with access rights when the document is to be shared with the next user in a series. In an embodiment, a tuple including sharing path is added to a metadata of the document along with access rights. The sharing path includes sequence information about one or more next users and one or more intermediate users with whom the document is to be shared in the series. Further, the document management and collaboration system 116 may share the document with the next user. Additionally, the document management and collaboration system 116 may include a pointer in the document to record preceding senders of the document.

The document management and collaboration system 116 may perform one or more decryptions using one or more keys that are generated for the one or more next users specified in the sharing path in a series for getting encrypted document upon receiving a request from the next user for accessing the document. The document management and collaboration system 116 may also send a request to access the primary key to recover an un-encrypted document from the encrypted document. Further, upon granting access to the primary key, document management and collaboration system 116 may use the primary key to recover un-encrypted document from the encrypted document. The access to the un-encrypted document is then provided to the next user. In an embodiment, the next user is a current recipient of the document. The next user can now be able to perform one or more actions on the un-encrypted document based on the access rights bound to the document. The one or more actions include downloading a copy of the document, viewing the document and modifying the document.

For example, a current user A shares a document W with a next user B that is encrypted using a key K_ABW generated for the next user B. The next user B then again shares the document with another next user C that is further encrypted using a new key K_BCW generated for the next user C. The document management and collaboration system 116 may add the explicit sharing path to the metadata of the document representing the sharing of document W from A=>B=>C. In the above example, when the current user A passes W to the next user B, the document management and collaboration system 116 may add a tuple to the metadata, A=>B, along with access rights authorized to the next user B, and further encrypts the tuple using the current user A's secret key or credentials. The document management and collaboration system 116 further includes a pointer to record the receipt of W by the current user A. When the next user B attempts to access the shared document by sending a request to access the document, the document management and collaboration system 116 may check the pointer to determine the preceding sender of the document. Upon determining that the preceding sender is the current user A, the document management and collaboration system 116 may check with the current user A if the next user B still has the right to access the document W. Upon receiving confirmation about the access rights, the document management and collaboration system 116 may securely provide the first user A's secret key to the next user B. If not, an access error is presented to the next user B.

Similarly, when the next user B passes W to the next user C, the document management and collaboration system 116 may add a tuple to the metadata, A=>B=>C, along with access rights authorized to C. The document management and collaboration system 116 may again encrypt the tuple using B's secret credentials. The document management and collaboration system 116 further includes a pointer to record the receipt of W by the current user A and the next user B. So, when another next user C attempts to access the shared document W by sending the access request, the document management and collaboration system 116 may check the pointer to determine the preceding sender of the document. Upon determining that the preceding sender is the next user B, the document management and collaboration system 116 may check with the next user B if another next user C still has the right to access the document W. If so, the document management and collaboration system 116 may securely provide the second user B's secret key to another next user C. If not, an access error is presented to another next user C.

The document management and collaboration system 116 may create one or more compressed paths in the sharing path using the shared path compression technique. The document management and collaboration system 116 may also generate one or more keys for the one or more compressed paths. Further, the document management and collaboration system 116 may encrypt the document using each key of the one or more keys generated for corresponding compressed path of the one or more compressed paths to generate one or more double encrypted documents. Additionally, the document management and collaboration system 116 may add access rights and the corresponding compressed path to each double encrypted document. The generation of the one or more compressed paths may eliminate the need of performing multiple decryptions by forming a direct path between the current user and last user by eliminating intermediate users in the sharing path.

The document management and collaboration system 116 may perform a decryption of the double encrypted document using the key generated for the corresponding compressed path for recovering encrypted document upon receiving a request from a user specified in the corresponding compressed path to access the document. The document management and collaboration system 116 may also send a request to access the primary key to recover an un-encrypted document from the encrypted document. Further, upon granting access to the primary key, the document management and collaboration system 116 may use the primary key to recover the un-encrypted document from the encrypted document. The access to the un-encrypted document is provided to the user.

As explained with reference to previous example, a compressed path A=>C may also be generated by the document management and collaboration system 116 for future sharing and consumption of the document W.

In another embodiment, in the shared path compression technique, the document management and collaboration system 116 may generate a new key for each sharing action upon receiving a sharing request from a current user of the document for sharing the document with a next user. The new key is generated from/or encrypted with current user's (sender's) or user's organization secret credentials. The document management and collaboration system 116 may also encrypt the document with new key generated from the sender's secret credentials. Further, the document management and collaboration system 116 may add a next hop to the sharing path. Additionally, the document management and collaboration system 116 may record original provenance record of the document to construct the complete sharing path when needed.

So, when a recipient attempts to access the shared document by sending an access request, the document management and collaboration system 116 may check the pointer associated with the document to determine the sender of the document. Upon determining sender of the document, the document management and collaboration system 116 may check with the sender if the recipient has the right to access the document. If so, the document management and collaboration system 116 may securely provide the document encryption key to the recipient. If not, an access error is presented to the recipient. Therefore, if an intermediate user loses access due to an organizational change, the document management and collaboration system 116 may revoke access of the intermediate user and add independent tuples for other users to ensure that the other users are notified and are provided their authorized access even if the intermediate user access is revoked.

Figure 8:
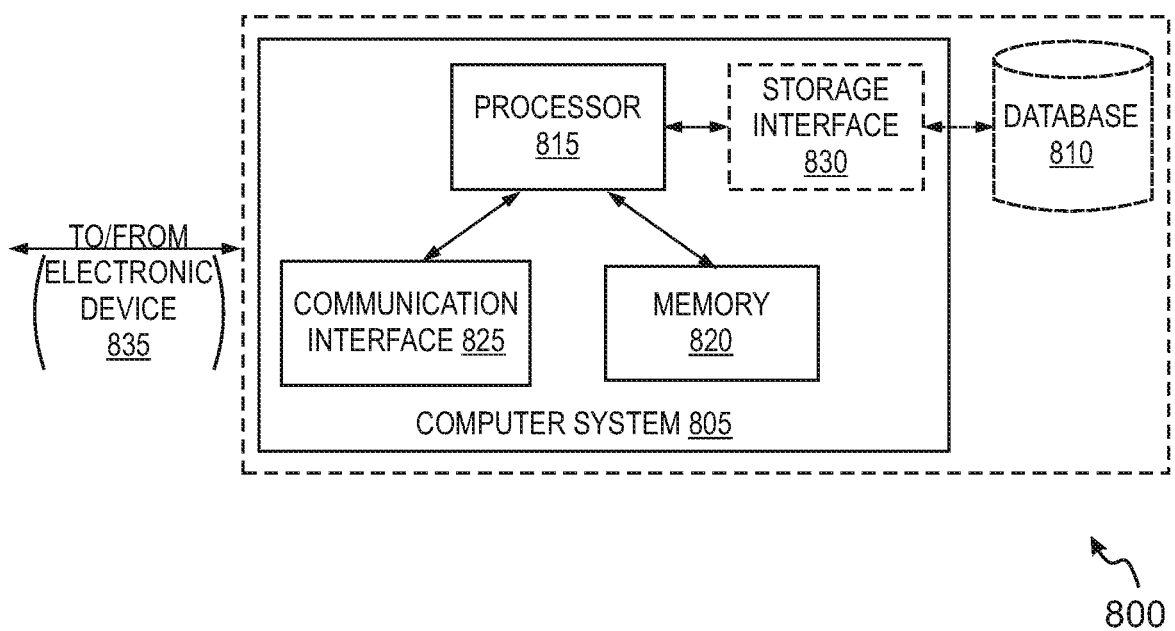
FIG. 8 is a block diagram of a server system of FIG. 1, in accordance with an example embodiment of the present disclosure.

It is noted that the instructions (or the executable code) configuring the document management and collaboration system 116 are stored in a memory of the server 120 and the instructions are executed by a processor (for example, a single-core or a multi-core processor) included within the server 120, as is exemplarily shown with reference to FIG. 8. Accordingly, even though the various functionalities for encrypting shared information through its lifecycle are explained with reference to or being performed by the document management and collaboration system 116, it is understood that the processor in conjunction with the code in the memory is configured to execute the various tasks as enabled by the instructions of the document management and collaboration system 116.

The various components of the document management and collaboration system 116 are further explained with reference to FIG. 2.

Figure 2:
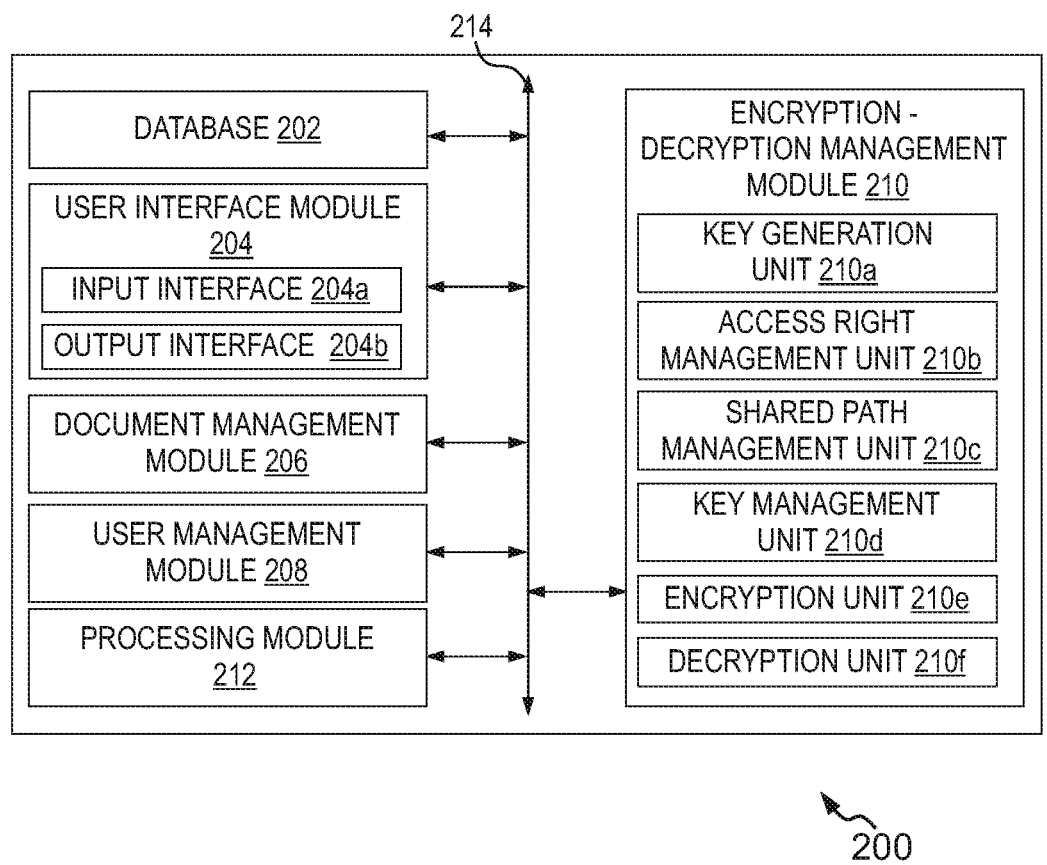
FIG. 2 is a block diagram of a system for encrypting shared information through its lifecycle, in accordance with an example embodiment.

FIG. 2 is a block diagram of a system 200 for encrypting shared information through its lifecycle, in accordance with an example embodiment. The system 200 is configured to generate and allocate a new key for each sharing action in a cascading order for ensuring secured sharing of a document (e.g., the document 118) along a sharing path. In an embodiment, the system 200 includes a database 202, a user interface (UI) module 204, a document management module 206, a user management module 208, an encryption-decryption management module 210, a processing module 212 and a centralized circuit system 214.

The database 202 is configured to store one or more documents received from one or more users (e.g., the user 102, 106 and 110). The database 202 is also configured to store access rights and a sharing path associated with each document of the one or more documents. Further, the database 202 is configured to store user details associated with each user of the one or more users. The user details include, but are not limited to, user identification (ID), user name, name of organization and user location.

The UI module 204 is in communication with the database 202. The UI module 204 is configured to present one or more UIs for facilitating encryption of shared information through its lifecycle. The UI module 204 includes an input interface 204a and an output interface 204b. The input interface 204a is configured to receive one or more documents that are to be remotely stored. The input interface 204a is also configured to receive user details associated with each user. Further, the input interface 204a is also configured to receive requests for accessing one or more stored documents from one or more users (e.g., the user 102) of the system 200. Additionally, the input interface 204a is configured to receive a request from a current user to make a document available for access to one or more next users. In an embodiment, the current user is the user who has created and stored the document in the system 200. Examples of the input interface 204a may include but are not limited to, a keyboard, a mouse, a joystick, a keypad, a touch screen, soft keys, a floppy disk, a pen drive, a hard drive and the like. The output interface 204b is configured to facilitate accessing of the one or more documents by the current user and the one or more next users of the system 200. In an embodiment, the output interface 204b is configured to display one or more documents to the current user and the one or more next users. In another embodiment, the output interface 204b is configured to display access rights of the one or more documents to the one or more next users.

Examples of the output interface 204b may include, but are not limited to, a display such as a light emitting diode (LED) display, a thin-film transistor (TFT) display, a liquid crystal display, an active-matrix organic light-emitting diode (AMOLED) display, and the like. In an embodiment, the input interface 204a and the output interface 204b are based on application programming interfaces (APIs). In an example, the input interface 204a can receive input data and the output interface 204b can provide output data via API calls.

The document management module 206 in communication with the database 202. The document management module 206 is configured to manage the one or more documents that are stored in the database 202. The management of the documents includes management of access rights of each document, management of a current user of each document and management of the one or more next users of each document.

The user management module 208 is in communication with the database 202. The user management module 208 is configured to manage the current user and the one or more next users of the system 200. The management of the users includes management of the documents stored by the each current user and each next user, management of the documents accessed by the each user and each next user and generation and maintenance of profile of the each user and each next user.

The encryption-decryption management module 210 is in communication with the database 202, the UI module 204 and the document management module 206. The encryption-decryption management module 210 is configured to perform multiple encryptions and multiple decryptions of the one or more documents for facilitating secured sharing of the one or more documents in a series. In an embodiment, the encryption-decryption management module 210 includes a key generation unit 210a, an access right management unit 210b, a shared path management unit 210c, a key management unit 210d, an encryption unit 210e and a decryption unit 210f.

The key generation unit 210a is configured to generate a key for each next user that is specified in a sharing request received for sharing each document of the one or more documents in a series. The key generation unit 210a is also configured to generate one or more keys for one or more compressed paths to be created in a sharing path to be attached to each document.

The access right management unit 210b is configured to manage access rights of each document by authorizing every access request that is received to access a document. The access right management unit 210b is also configured to re-encrypt the access rights bound to the document whenever an update is performed on the access rights.

The shared path management unit 210c is configured to create and manage the sharing path to be attached to each document of the one or more documents based on sharing requests received for the document. The managing of the sharing path includes addition of one or more paths in the sharing path and deletion of one or more paths in the sharing path. The shared path management unit 210c is also configured to create the one or more compressed paths in the sharing path using a shared path compression technique.

The key management unit 210d is in communication with the key generation unit 210a and the shared path management unit 210c. The key management unit 210d is configured to manage use of keys to be performed while performing multiple encryptions and decryptions of the document being shared.

The encryption unit 210e is in communication with the key management unit 210d. The encryption unit 210e is configured to perform encryption of the document for every sharing request that is received for the document using the new key generated for the corresponding sharing request.

The decryption unit 210f is in communication with the key management unit 210d. The decryption unit 210f is configured to perform a plurality of decryptions along the sharing path to provide an un-encrypted original document to the next user with whom the document is being shared.

The processing module 212 is in communication with the database 202, the UI module 204, the document management module 206, the user management module 208 and the encryption-decryption management module 210. The processing module 212 is configured to send operating instructions to the database 202, the UI module 204, the document management module 206, the user management module 208 and the encryption-decryption management module 210 for facilitating secured access of the one or more documents stored in the system 200.

The database 202, the UI module 204, the document management module 206, the user management module 208, the encryption-decryption management module 210 and the processing module 212 may be configured to communicate with each other via or through the centralized circuit system 214. The centralized circuit system 214 may be various devices configured to, among other things, provide or enable communication between the modules (202-212) of the system 200. In certain embodiments, the centralized circuit system 214 may be a central printed circuit board (PCB) such as a motherboard, a main board, a system board, or a logic board. The centralized circuit system 214 may also, or alternatively, include other printed circuit assemblies (PCAs) or communication channel media. In some embodiments, the centralized circuit system 214 may include appropriate storage interfaces to facilitate communication among the modules (202-212). Some examples of the storage interface may include, for example, an Advanced Technology Attachment (ATA) adapter, a Serial ATA (SATA) adapter, a Small Computer System Interface (SCSI) adapter, a RAID controller, a SAN adapter or a network adapter.

Figure 3:
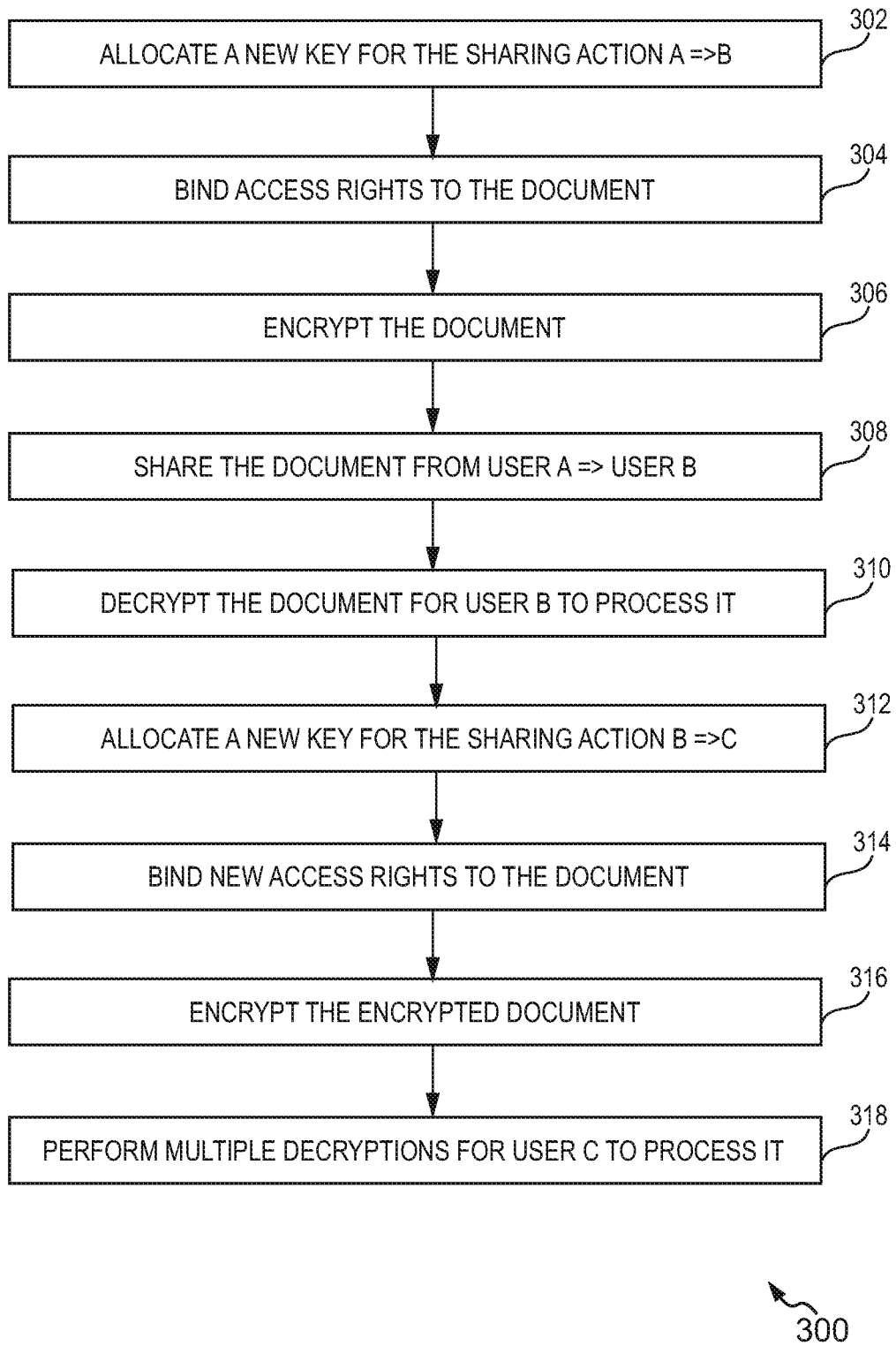
FIG. 3 is a flow diagram for secured sharing of a shared document, in accordance with an example embodiment.

FIG. 3 is a flow diagram 300 for secured sharing of a shared document, in accordance with an example embodiment. The operations of the flow diagram 300 may be carried out by the document management and collaboration system 116 included in the server 120. The sequence of operations the flow diagram 300 is performed when a user A shares a document with a next user B who further shares the document with another next user C. The sequence of operations of the flow diagram 300 may not to be necessarily executed in the same order as they are presented. Further, one or more operations may be grouped together and performed in form of a single step, or one operation may have several sub-steps that may be performed in parallel or in sequential manner.

At operation 302, a new key is generated and allocated for a sharing action A to B as the user A may want to share the document (e.g., the document 118) with the user B. The user A may have earlier requested the document management and collaboration system 116 to encrypt the document for securing the stored document. The document management and collaboration system 116 may encrypt the document using a primary key. The user A may then send a request to the document management and collaboration system 116 for sharing the document with the user B. Upon receiving the request, the document management and collaboration system 116 may generate a new key for the user B.

At operation 304, access rights are bound to the document. In an embodiment, the access rights include information about a type of access that is granted to each user of the shared document. So, the access rights for the user B may be added in the access rights of the document. The bound access rights may help the document management and collaboration system 116 in authorizing access requests that are sent by next users (the user B in current scenario) for accessing the document.

At operation 306, the document is encrypted using the key generated for the user B. So, the encrypted document is again encrypted by the document management and collaboration system 116. At operation 308, the user A shares the double encrypted document with the user B.

At operation 310, the shared document is decrypted for the user B to process it. The document management and collaboration system 116 may first decrypt the double encrypted document using the new key generated for the sharing action that is performed for sharing the document with the next user i.e. the user B. Upon granting access of the primary key, the document management and collaboration system 116 may decrypt the encrypted document using the primary key. The user B can now access the document based on the access rights assigned to the user B.

At operation 312, a new key is allocated for a sharing action B to C. As the user B now wants to share the document with the user C, a request is sent to the document management and collaboration system 116 by the user B for sharing the document with the user C. Upon receiving the request, the document management and collaboration system 116 may generate and allocate a new key for the sharing action that is performed for sharing the document with the next user i.e. the user C.

At operation 314, new access rights are bound to the document. The new access rights may include access rights for the user C as well along with the user A and B. At operation 316, the double encrypted document is encrypted again using the key generated for the sharing action B to C. A triple encrypted document may then be shared with the user C.

At operation 318, multiple decryptions are performed for the user C to process it. The document management and collaboration system 116 may first decrypt the triple encrypted document using the new key generated for the sharing action B to C and then again decrypt the double encrypted document using the new key generated for the sharing action A to B. After getting the encrypted document, the document management and collaboration system 116 may send a request to access the primary key. Upon granting access of the primary key, the document management and collaboration system 116 may decrypt the encrypted document using the primary key. The user C can now access the document based on the access rights assigned to the user C.

Figure 4:
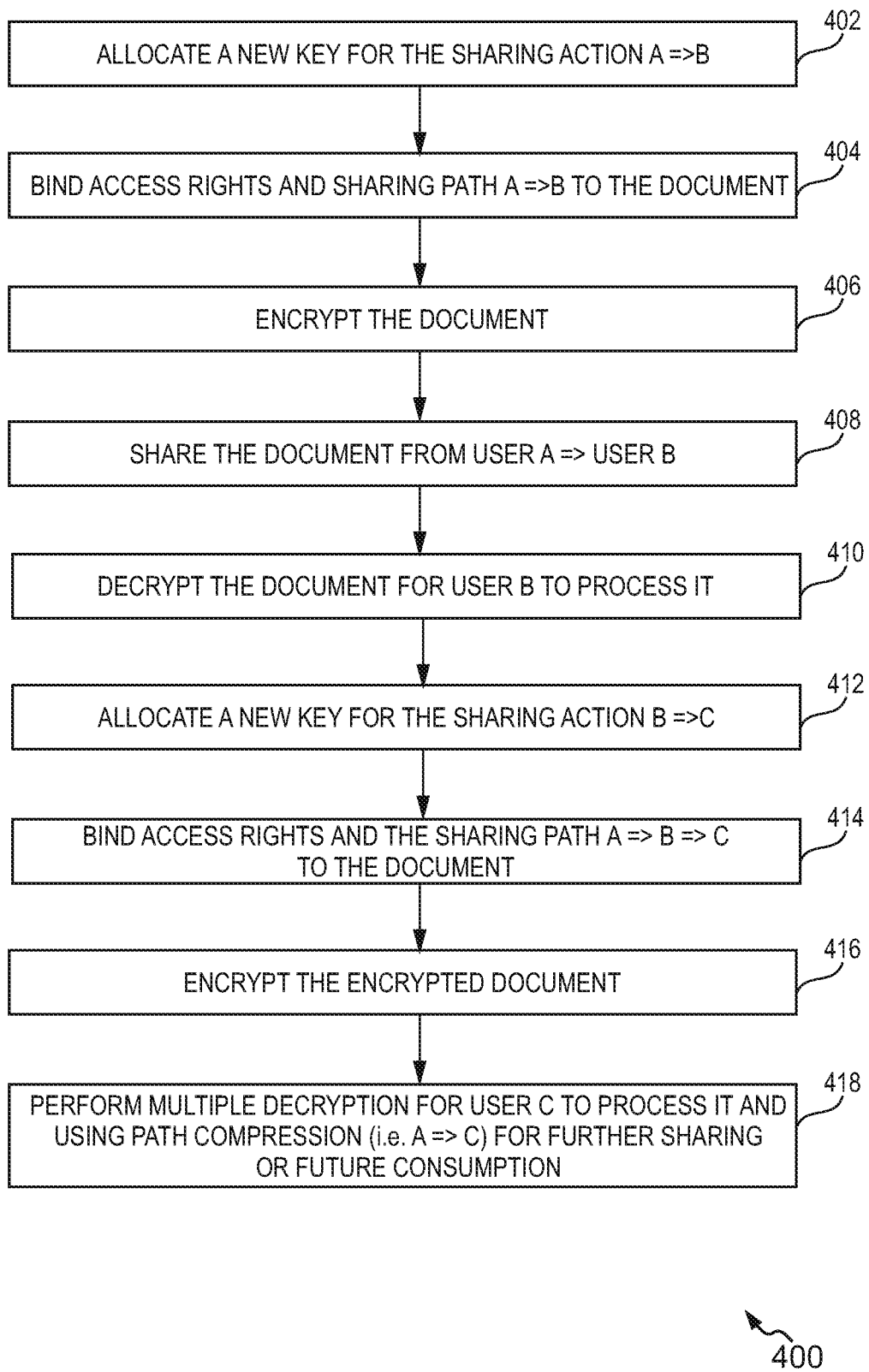
FIG. 4 is a flow diagram for secured sharing of a shared document using a shared path compression technique, in accordance with an example embodiment.

FIG. 4 is a flow diagram 400 for secured sharing of a shared document using a shared path compression technique, in accordance with an example embodiment. The operations of the flow diagram 400 may be carried out by the document management and collaboration system 116 included in the server 120. The sequence of operations the flow diagram 400 is performed when a user A shares a document with a next user B who further shares the document with another next user C. The sequence of operations of the flow diagram 400 may not to be necessarily executed in the same order as they are presented. Further, one or more operations may be grouped together and performed in form of a single step, or one operation may have several sub-steps that may be performed in parallel or in sequential manner.

At operation 402, a new key is generated and allocated for a sharing action A to B as the user A may want to share the document (e.g., the document 118) with the user B. In an embodiment, the new key is generated using secret key or credentials of the user A. The user A may have earlier requested the document management and collaboration system 116 to encrypt the document for securing the stored document. The document management and collaboration system 116 may encrypt the document using a primary key. The user A may then send a request to the document management and collaboration system 116 for sharing the document with the next user B. Upon receiving the request, the document management and collaboration system 116 may generate and allocate the new key for the next user B.

At operation 404, access rights and a sharing path A to B are bound to the document. In an embodiment, the sharing path includes sequence information about one or more next users and one or more intermediate users with whom the document is being shared in the series (the user B being the intermediate user and the user C being the next user in current example). Since the user A is sharing the document with user B, the sharing path like A=>B may be added to the document. In an embodiment, a pointer may also be added to record preceding senders i.e. to represent that the user A is the predecessor of the document. The access rights for authorizing the user B may also be added in the access rights of the document along with the sharing path. The bound access rights may help the document management and collaboration system 116 in authorizing access requests that are sent by one or more next users (the user B in current scenario) for accessing the document.

At operation 406, the document is encrypted using the new key generated for the sharing action A to B. So, the encrypted document is again encrypted by the document management and collaboration system 116. At operation 408, the user A shares the double encrypted document with the next user B.

At operation 410, the shared document is decrypted for the user B to process it. The document management and collaboration system 116 may first decrypt the double encrypted document using the new key generated for the sharing action and then may check with the user A if the user B still has the right to access the document. Upon determining that the user B has access to the document, the document management and collaboration system may securely provide the primary key of the current user A to the next user B. The primary key of the user A may be further used to obtain the unencrypted document. The user B can now access the unencrypted document based on the access rights assigned to the user B.

At operation 412, a new key is allocated for a sharing action B to C. In an embodiment, the new key is generated using secret key or credentials of the user B. As the next user B now wants to share the document with another next user C, a request is sent to the document management and collaboration system 116 by the user B for sharing the document with the user C. Upon receiving the request, the document management and collaboration system 116 may generate and allocate a new key for the sharing action B to C.

At operation 414, the access rights and a sharing path A to B to C are bound to the document. Since the user B had received the document from the user A and is now sharing the document with the user C, the sharing path like A=>B=>C may be added to the document. In an embodiment, a pointer may also be added to record preceding senders i.e. to represent that the user A and the user B are the predecessors of the document. The access rights for authorizing the next user C may also be added in the access rights of the document along with the sharing path. The bound access rights may help the document management and collaboration system 116 in authorizing access requests that are sent by one or more next users (the user C in current scenario) for accessing the document.

At operation 416, the encrypted document is again encrypted using the new key generated for the sharing action B to C. At operation 418, multiple decryptions are performed for the user C to process it and the document is again re-encrypted using a path compression from A=>C for further sharing and future consumption. The document management and collaboration system 116 may first decrypt the triple encrypted document using the new key generated for the sharing action B to C and then again decrypt the double encrypted document using the new key generated for the sharing action A to B. After getting the encrypted document, the document management and collaboration system 116 may send a request to access the primary key. Upon granting access of the primary key, the document management and collaboration system 116 may decrypt the encrypted document using the primary key. The user C can now access the unencrypted document based on the access rights assigned to the user C. The document is again encrypted using a new key generated for a compressed path A to C that is generated from the sharing path by adding a sharing path A=>C to the document. The sharing path A=>C is added for performing path compression for future consumption. For example, if the user C again shares a document with a user D, the number of decryptions to be performed for the user D may reduce because of the direct sharing path from A=>C.

Figure 5:
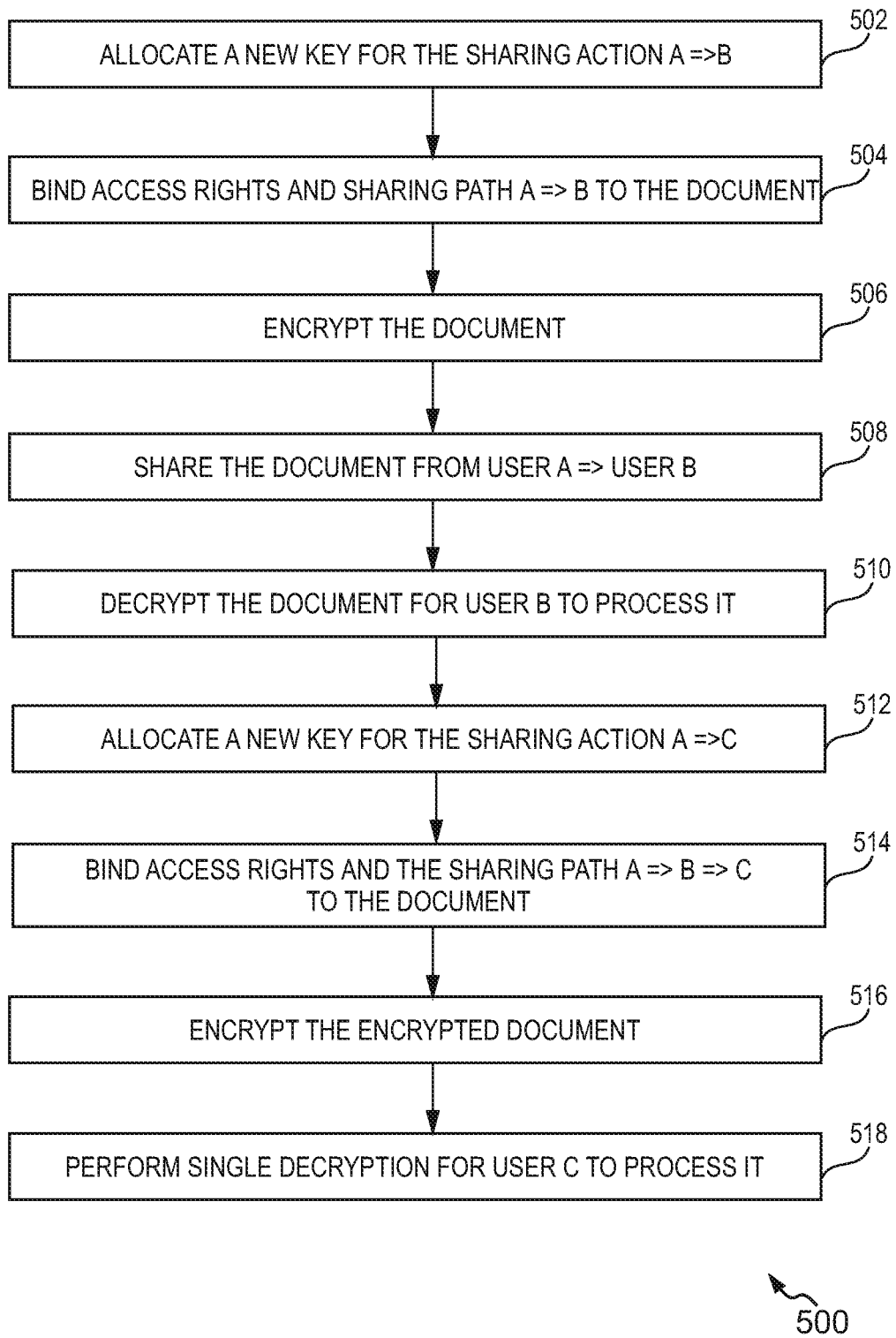
FIG. 5 is a flow diagram for secured sharing of a shared document using another shared path compression technique, in accordance with another example embodiment.

FIG. 5 is a flow diagram 500 for secured sharing of a shared document using another shared path compression technique, in accordance with an example embodiment. The operations of the flow diagram 500 may be carried out by the document management and collaboration system 116 included in the server 120. The sequence of operations the flow diagram 500 is performed when a current user A shares a document with a next user B who further shares the document with a next user C. The sequence of operations of the flow diagram 500 may not to be necessarily executed in the same order as they are presented. Further, one or more operations may be grouped together and performed in form of a single step, or one operation may have several sub-steps that may be performed in parallel or in sequential manner.

At operation 502, a new key is generated and allocated for a sharing action A to B as the current user A may want to share the document (e.g., the document 118) with the next user B. In an embodiment, the new key is generated using secret key or credentials of the user A. The user A may have earlier requested the document management and collaboration system 116 to encrypt the document for securing the stored document. The document management and collaboration system 116 may encrypt the document using a primary key. The user A may then send a request to the document management and collaboration system 116 for sharing the document with the next user B. Upon receiving the request, the document management and collaboration system 116 may generate and allocate the new key for the sharing action A to B.

At operation 504, access rights and a sharing path A to B are bound to the document. In an embodiment, the sharing path includes sequence information about one or more next users and one or more intermediate users with whom the document is being shared in the series (the user B being the intermediate user and the user C being the next user in current example). Since the current user A is sharing the document with the next user B, the sharing path like A=>B may be added to the document. In an embodiment, a pointer may also be added to record preceding senders i.e. to represent that the user A is the predecessor of the document. The access rights for authorizing the next user B may also be added in the access rights of the document along with the sharing path. The bound access rights may help the document management and collaboration system 116 in authorizing access requests that are sent by one or more next users (the user B in current scenario) for accessing the document.

At operation 506, the document is encrypted using the new key generated for the sharing action A to B. So, the encrypted document is again encrypted by the document management and collaboration system 116. At operation 508, the double encrypted document is shared by the current user A to the next user B.

At operation 510, the shared document is decrypted for the user B to process it. The document management and collaboration system 116 may first decrypt the double encrypted document using the new key generated for the sharing action A to B and then may check with the user A if the user B still has the right to access the document. Upon determining that the user B has access to the document, the document management and collaboration system may securely provide the primary key of the user A to the second user B. The primary key of the user A may be further used to obtain the unencrypted document. The user B can now access the unencrypted document based on the access rights assigned to the user B.

At operation 512, a new key is allocated for the sharing action A to C. As the next user B now wants to share the document with another next user C, a request is sent to the document management and collaboration system 116 by the user B for sharing the document with the user C. Upon receiving the request, the document management and collaboration system 116 instead of generating a key for a sharing action B to C, generates and allocates the new key for the sharing action A to C. The allocation of the new key for the sharing action A to C is done for performing path compression that further helps in reducing the number of decryption to be performed for the user C as removal of the sharing path B to C eliminates the need for second decryption and also ensures that access to the user C is not consequently revoked even if access of the user B is revoked.

At operation 514, the access rights and a sharing path A to B to C are bound to the document. Since the user B had received the document from the user A and is now sharing the document with the user C, the sharing path like A=>B=>C may be added to the document. The sharing path may still include user B to represent that the sharing request is received from the user B. In an embodiment, a pointer may also be added to record preceding senders i.e. to represent that the user A and the user B are the predecessors of the document. The access rights for authorizing the user C may also be added in the access rights of the document along with the sharing path. The bound access rights may help the document management and collaboration system 116 in authorizing access requests that are sent by one or more secondary users (the user C in current scenario) for accessing the document.

At operation 516, the encrypted document is again encrypted using the new key generated for the sharing action A to C. At operation 518, a single decryption is performed for the user C to process it. The document management and collaboration system 116 may first decrypt the encrypted document using the new key generated for the sharing action A to C and then may send a request to the user A for accessing the primary key. Upon granting access of the primary key, the document management and collaboration system 116 may decrypt the encrypted document using the primary key. The user C can now access the unencrypted document based on the access rights assigned to the user C.

Figure 6:
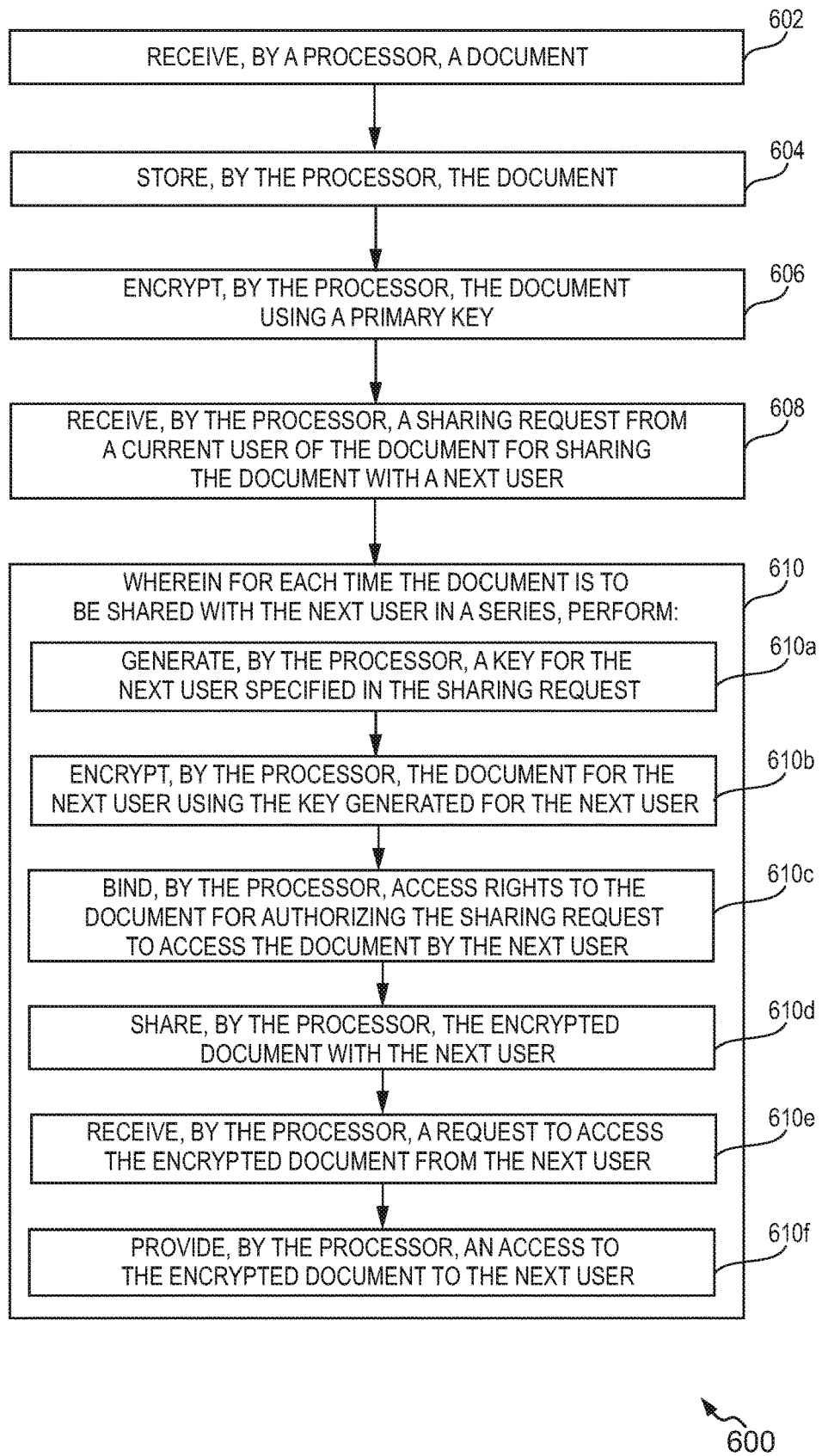
FIG. 6 is flowchart illustrating a method for encrypting shared information through its life cycle, in accordance with an example embodiment.

FIG. 6 is a flowchart illustrating a method 600 for encrypting shared information through its life cycle, in accordance with an example embodiment. The operations of the method 600 may be carried out by the document management and collaboration system 116 included in the server 120 or the system 200. The sequence of operations of the method 600 may not to be necessarily executed in the same order as they are presented. Further, one or more operations may be grouped together and performed in form of a single step, or one operation may have several sub-steps that may be performed in parallel or in sequential manner.

At operation 602, the method 600 includes receiving, by a processor, a document. The document that a user remotely wants to store is received. At operation 604, the method 600 includes storing, by a processor, the document. The document that the user remotely wants to store is stored in a database. At operation 606, the method 600 includes encrypting, by the processor, the document using a primary key. The document is encrypted using the primary for maintaining security of the document.

At operation 608, the method 600 includes receiving, by the processor, a sharing request from a current user of the document for sharing the document with a next user. The current user may send the sharing request for making document available for access to the next user. In an embodiment, the current user is a user who has stored the document in the document management and collaboration system 116. For example, if a user A may want to provide an access of a document to a user, then user A becomes the current user and the user B may become the next user.

The operation 610 is a combination of operations 610a to 610f. The operation 610 is performed each time the document is to be shared with the next user in a series.

At operation 610a, the method 600 includes generating, by the processor, a key for the next user specified in the sharing request. Each key is generated and allocated to provide the document access to the next user. As stated in example, the user A wants to share the document with the user B, so a key is generated for the user B. Access rights are also bound to the document for authorizing request received for accessing the document by the next user. The access rights define who all (next users) can access the document and what kind of access is provided to each next user. In an embodiment, the key for the next user is generated and allocated in using a shared path compression technique. In case of the shared path compression technique, a sharing path is added to the document before encrypting the document and access rights for each next user are embedded in the sharing path.

At operation 610b, the method 600 includes encrypting, by the processor, the document for the next user using the key generated for the corresponding next user. The document is again encrypted using the key generated for the next user. As stated in example, the document may be encrypted using the key generated for the user B.

At operation 610c, the method 600 includes binding, by the processor, access rights to the document for authorizing the request to access the document by the next user. The access rights including a type of access provided to the next user are added to the document.

At operation 610d, the method 600 includes sharing, by the processor, the encrypted document with the next user. The encrypted document is shared with the next user. At operation 610e, the method 600 includes receiving, by the processor, a request to access the encrypted document from the next user. As stated in the example, when the user A shared the document with the user B, the user B may send a request for accessing the shared document. The request received from the next user to access the document is authorized using the access rights bound to the document.

At operation 610f, the method 600 includes providing, by the processor, an access to the encrypted document to the next user. The access to the encrypted document meant for the next user is provided to the next user upon successful authorization. Once the access is granted to the next user, the one or more decryptions are performed on the document using one or more keys that are generated for one or more next users specified in one or more sharing requests received for the document in the series. Once the one or more decryptions are performed on the document, a request to access the primary key to recover an un-encrypted document from the encrypted document is sent. When the access to the primary key is granted, the primary key that is used to first encrypt the document is again used to recover un-encrypted document from the encrypted document. The access to the un-encrypted document is provided to the next user. The next user is a current recipient of the document. Once the access to the un-encrypted document is granted to the next user, the next user can perform one or more actions on the un-encrypted document based on the access rights bound to the document. The one or more actions include downloading a copy of the document, viewing the document and modifying the document.

Figure 7:
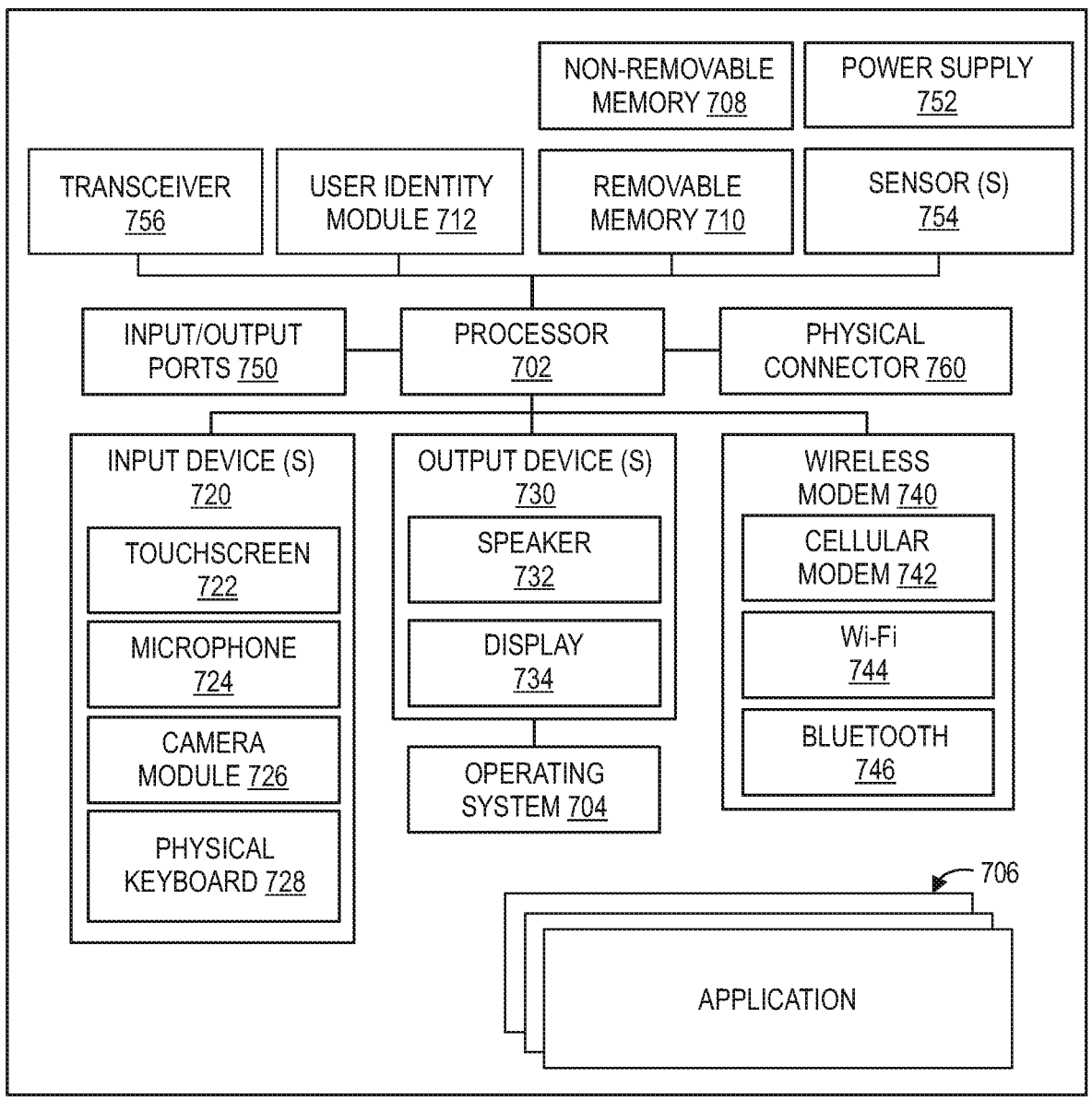
FIG. 7 is a block diagram of an electronic device capable of implementing the various embodiments of the present disclosure, in accordance with an example embodiment.

FIG. 7 shows a simplified block diagram of an electronic device 700 capable of implementing the various embodiments of the present disclosure. The electronic device 700 may be an example of the electronic devices 104, 108 and 112. It should be understood that the electronic device 700 as illustrated and hereinafter described is merely illustrative of one type of device and should not be taken to limit the scope of the embodiments. As such, it should be appreciated that at least some of the components described below in connection with the electronic device 700 may be optional and thus in an example embodiment may include more, less or different components than those described in connection with the example embodiment of the FIG. 7. As such, among other examples, the electronic device 700 could be any of an electronic device or may be embodied in any of the electronic devices, for example, cellular phones, tablet computers, laptops, mobile computers, personal digital assistants (PDAs), mobile televisions, mobile digital assistants, or any combination of the aforementioned, and other types of communication or multimedia devices.

The illustrated electronic device 700 includes a controller or a processor 702 (e.g., a signal processor, microprocessor, ASIC, or other control and processing logic circuitry) for performing such tasks as signal coding, data processing, image processing, input/output processing, power control, and/or other functions. An operating system 704 controls the allocation and usage of the components of the electronic device 700 and provides support for one or more programs that implement one or more of the innovative features described herein. The applications 706 may include common mobile computing applications (e.g., telephony applications, email applications, calendars, contact managers, web browsers, messaging applications such as USSD messaging or SMS messaging or SIM Tool Kit (STK) application) or any other computing application.

The illustrated electronic device 700 includes one or more memory components, for example, a non-removable memory 708 and/or a removable memory 710. The non-removable memory 708 and/or the removable memory 710 may be collectively known as storage device/module in an embodiment. The non-removable memory 708 can include RAM, ROM, flash memory, a hard disk, or other well-known memory storage technologies. The removable memory 710 can include flash memory, smart cards, or a Subscriber Identity Module (SIM). The one or more memory components can be used for storing data and/or code for running the operating system 704. The electronic device 700 may further include a user identity module (UIM) 712. The UIM 712 may be a memory device having a processor built in. The UIM 712 may include, for example, a subscriber identity module (SIM), a universal integrated circuit card (UICC), a universal subscriber identity module (USIM), a removable user identity module (R-UIM), or any other smart card. The UIM 712 typically stores information elements related to a mobile subscriber. The UIM 712 in form of the SIM card is well known in Global System for Mobile (GSM) communication systems, Code Division Multiple Access (CDMA) systems, or with third-generation (3G) wireless communication protocols such as Universal Mobile Telecommunications System (UMTS), CDMA9000, wideband CDMA (WCDMA) and time division-synchronous CDMA (TD-SCDMA), or with fourth-generation (4G) wireless communication protocols such as LTE (Long-Term Evolution).

The electronic device 700 can support one or more input devices 720 and one or more output devices 730. Examples of the input devices 720 may include, but are not limited to, a touch screen/a display screen 722 (e.g., capable of capturing finger tap inputs, finger gesture inputs, multi-finger tap inputs, multi-finger gesture inputs, or keystroke inputs from a virtual keyboard or keypad), a microphone 724 (e.g., capable of capturing voice input), a camera module 726 (e.g., capable of capturing still picture images and/or video images) and a physical keyboard 728. Examples of the output devices 730 may include, but are not limited, to a speaker 732 and a display 734. Other possible output devices can include piezoelectric or other haptic output devices. Some devices can serve more than one input/output function. For example, the touch screen 722 and the display 734 can be combined into a single input/output device.

A wireless modem 740 can be coupled to one or more antennas (not shown in the FIG. 7) and can support two-way communications between the processor 702 and external devices, as is well understood in the art. The wireless modem 740 is shown generically and can include, for example, a cellular modem 742 for communicating at long range with the mobile communication network, a Wi-Fi compatible modem 744 for communicating at short range with an external Bluetooth-equipped device or a local wireless data network or router, and/or a Bluetooth-compatible modem 746. The wireless modem 740 is typically configured for communication with one or more cellular networks, such as a GSM network for data and voice communications within a single cellular network, between cellular networks, or between the electronic device 700 and a public switched telephone network (PSTN).

The electronic device 700 can further include one or more input/output ports 750, a power supply 752, one or more sensors 754 for example, an accelerometer, a gyroscope, a compass, or an infrared proximity sensor for detecting the orientation or motion of the electronic device 700, a transceiver 756 (for wirelessly transmitting analog or digital signals) and/or a physical connector 760, which can be a USB port, IEEE 1294 (FireWire) port, and/or RS-232 port. The illustrated components are not required or all-inclusive, as any of the components shown can be deleted and other components can be added.

The disclosed systems and methods with reference to FIGS. 1 to 7, or one or more operations of the method 600 and the flow diagrams 300, 400 and 500 may be implemented using software including computer-executable instructions stored on one or more computer-readable media (e.g., non-transitory computer-readable media, such as one or more optical media discs, volatile memory components (e.g., DRAM or SRAM), or non-volatile memory or storage components (e.g., hard drives or solid-state non-volatile memory components, such as Flash memory components) and executed on a computer (e.g., any suitable computer, such as a laptop computer, net book, Web book, tablet computing device, smart phone, or other mobile computing device). Such software may be executed, for example, on a single local computer or in a network environment (e.g., via the Internet, a wide-area network, a local-area network, a remote web-based server, a client-server network (such as a cloud computing network), or other such network) using one or more network computers. Additionally, any of the intermediate or final data created and used during implementation of the disclosed methods or systems may also be stored on one or more computer-readable media (e.g., non-transitory computer-readable media) and are considered to be within the scope of the disclosed technology. Furthermore, any of the software-based embodiments may be uploaded, downloaded, or remotely accessed through a suitable communication means. Such suitable communication means includes, for example, the Internet, the World Wide Web, an intranet, software applications, cable (including fiber optic cable), magnetic communications, electromagnetic communications (including RF, microwave, and infrared communications), electronic communications, or other such communication means.

FIG. 8 is a simplified block diagram of a server system 800, in which the document management and collaboration system 116 is provided, in accordance with one embodiment of the present disclosure. The server system 800 is an example of the server 120 shown and explained with reference to FIG. 1. The server system 800 includes a computer system 805 and one or more databases, such as a database 810.

The computer system 805 includes a processor 815 for executing instructions. Instructions may be stored in, for example, but not limited to, a memory 820. The processor 815 may include one or more processing units (e.g., in a multi-core configuration). The processor 815 is operatively coupled to a communication interface 825 such that the computer system 805 is capable of communicating with a remote device such as an electronic device 835. Example of the electronic device 835 may include, but is not limited to, the electronic devices 104, 108 and 112 shown in FIG. 1.

The processor 815 may also be operatively coupled to the database 810. The database 810 is configured to store one or more documents that are to be remotely stored as explained with reference to FIGS. 1 to 7. The database 810 is any computer-operated hardware suitable for storing and/or retrieving data. The database 810 may include multiple storage units such as hard disks and/or solid-state disks in a redundant array of inexpensive disks (RAID) configuration.

The database 810 may include, but not limited to, a storage area network (SAN) and/or a network attached storage (NAS) system.

In some embodiments, the database 810 is integrated within the computer system 805. For example, the computer system 805 may include one or more hard disk drives as the database 810. In other embodiments, the database 810 is external to the computer system 805 and may be accessed by the computer system 805 using a storage interface 830. The storage interface 830 is any component capable of providing the processor 815 with access to the database 810. The storage interface 830 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing the processor 815 with access to the database 810.

The memory 820 is a storage device embodied as one or more volatile memory devices, one or more non-volatile memory devices, and/or a combination of one or more volatile memory devices and non-volatile memory devices, for storing micro-contents information and instructions. The memory 820 may be embodied as magnetic storage devices (such as hard disk drives, floppy disks, magnetic tapes, etc.), optical magnetic storage devices (e.g., magneto-optical disks), CD-ROM (compact disc read only memory), CD-R (compact disc recordable), CD-R/W (compact disc rewritable), DVD (Digital Versatile Disc), BD (Blu-ray® Disc), and semiconductor memories (such as mask ROM, PROM (programmable ROM), EPROM (erasable PROM), flash ROM, RAM (random access memory), etc.).

Various example embodiments offer, among other benefits, techniques for establishing methods and systems for encrypting shared information through its life cycle. The system allocates a new key for each sharing action in a cascading order thereby performing multiple encryptions on a shared document that avoids leakage of the document. The system uses a shared path compression technique for performing encryption, thereby reducing need of performing multiple decryption along the sharing path and the time taken for performing the decryption.

Although the invention has been described with reference to specific exemplary embodiments, it is noted that various modifications and changes may be made to these embodiments without departing from the broad spirit and scope of the invention. For example, the various operations, blocks, etc. described herein may be enabled and operated using hardware circuitry (for example, complementary metal oxide semiconductor (CMOS) based logic circuitry), firmware, software and/or any combination of hardware, firmware, and/or software (for example, embodied in a machine-readable medium). For example, the apparatuses and methods may be embodied using transistors, logic gates, and electrical circuits (for example, application specific integrated circuit (ASIC) circuitry and/or in Digital Signal Processor (DSP) circuitry).

The present disclosure is described above with reference to block diagrams and flowchart illustrations of method and system embodying the present disclosure. It will be understood that various blocks of the block diagram and flowchart illustrations, and combinations of blocks in the block diagrams and flowchart illustrations, respectively, may be implemented by a set of computer program instructions. These set of instructions may be loaded onto a general-purpose computer, special purpose computer, or other programmable data processing apparatus to cause a device, such that the set of instructions when executed on the computer or other programmable data processing apparatus creates a means for implementing the functions specified in the flowchart block or blocks. Although other means for implementing the functions including various combinations of hardware, firmware and software as described herein may also be employed.

Various embodiments described above may be implemented in software, hardware, application logic or a combination of software, hardware and application logic. The software, application logic and/or hardware may reside on at least one memory, at least one processor, an apparatus or, a non-transitory computer program product. In an example embodiment, the application logic, software or an instruction set is maintained on any one of various conventional computer-readable media. In the context of this document, a "computer-readable medium" may be any non-transitory medium or means that can contain, store, communicate, propagate or transport the instructions for use by or in connection with an instruction execution system, apparatus, or device, such as a computer. A computer-readable medium may include a computer-readable storage medium that may be any medium or means that can contain or store the instructions for use by or in connection with an instruction execution system, apparatus, or device, such as a computer.

The foregoing descriptions of specific embodiments of the present disclosure have been presented for purposes of illustration and description. They are not intended to be exhaustive or to limit the present disclosure to the precise forms disclosed, and obviously many modifications and variations are possible in light of the above teaching. The embodiments were chosen and described in order to best explain the principles of the present disclosure and its practical application, to thereby enable others skilled in the art to best utilize the present disclosure and various embodiments with various modifications as are suited to the particular use contemplated. It is understood that various omissions and substitutions of equivalents are contemplated as circumstances may suggest or render expedient, but such are intended to cover the application and\or implementation without departing from the spirit or scope of the claims.

What is claimed is:

1. A method, comprising:

receiving, by a processor, a document;

storing, by the processor, the document;

encrypting, by the processor, the document using a primary key;

receiving, by the processor, a sharing request from a current user of the document for sharing the document with a next user; and for each time the document is to be shared with the next user in a series, performing:

generating, by the processor, a key for the next user specified in the sharing request;

encrypting, by the processor, the document for the next user using the key generated for the corresponding next user;

binding, by the processor, access rights and a sharing path to the document for authorizing the sharing request to access the document by the next user, the sharing path comprising sequence information about one or more next users and one or more intermediate users with whom the document is being shared in the series;

creating, by the processor, one or more compressed paths in the sharing path using a shared path compression technique;

generating, by the processor, one or more keys for the one or more compressed paths;

encrypting, by the processor, the document using each key of the one or more keys generated for a corresponding compressed path of the one or more compressed paths to generate one or more double encrypted documents;

adding, by the processor, access rights and the corresponding compressed path to each double encrypted document;

sharing, by the processor, each double encrypted document with a user specified in the corresponding compressed path;

sharing, by the processor, the encrypted document with the next user;

receiving, by the processor, a request to access the encrypted document from the next user; and providing, by the processor, an access to the encrypted document to the next user.

2. The method as claimed in claim 1, wherein providing the access to the encrypted document comprises:

authorizing, by the processor, the request received from the next user to access the encrypted document using the access rights bound to the document; and upon successful authorization, providing, by the processor, the access to the encrypted document to the next user.

3. The method as claimed in claim 2, wherein providing the access to the encrypted document further comprises:

performing, by the processor, one or more decryptions using one or more keys that are generated for one or more next users specified in one or more sharing requests received for the encrypted document in the series;

sending, by the processor, a request to access the primary key to recover an un-encrypted document from the encrypted document;

upon granting access to the primary key, using, by the processor, the primary key to recover the un-encrypted document from the encrypted document; and providing, by the processor, the access to the un-encrypted document to the next user, the next user being a current recipient of the document.

4. The method as claimed in claim 3, wherein providing the access to the un-encrypted document comprises:

allowing, by the processor, one or more actions on the un-encrypted document based on the access rights bound to the document.

5. The method as claimed in claim 4, wherein the one or more actions comprise:

downloading a copy of the document;
viewing the document; and
modifying the document.

6. The method as claimed in claim 2 wherein providing the access to the encrypted document further comprises:

performing, by the processor, one or more decryptions using one or more keys that are generated for the one or more next users specified in the sharing path in the series;

sending, by the processor, a request to access the primary key to recover an un-encrypted document from the encrypted document;

upon granting access to the primary key, using, by the processor, the primary key to recover the un-encrypted document from the encrypted document; and providing, by the processor, the access to the un-encrypted document to the next user, the next user being a current recipient of the document.

7. The method as claimed in claim 6, wherein providing the access to the un-encrypted document comprises:

allowing, by the processor, one or more actions on the un-encrypted document based on the access rights bound to the document.

8. The method as claimed in claim 7, wherein the one or more actions comprise:

downloading a copy of the document;
viewing the document; and
modifying the document.

9. The method as claimed in claim 1, further comprising:

receiving, by the processor, a request to access the double encrypted document from the user;

authorizing, by the processor, the request received from the user to access the double encrypted document using the access rights bound to the document; and upon successful authorization, providing, by the processor, an access to the double encrypted document to the user.

10. The method as claimed in claim 9, wherein providing the access to the double encrypted document comprises:

performing, by the processor, a decryption of the double encrypted document using the key generated for the corresponding compressed path for recovering the encrypted document;

sending, by the processor, a request to access the primary key to recover an un-encrypted document from the encrypted document;

upon granting access to the primary key, using, by the processor, the primary key to recover the un-encrypted document from the encrypted document; and providing, by the processor, an access to the un-encrypted document to the user.

11. A system, comprising:

a memory configured to store instructions; and a processor configured to execute the instructions stored in the memory and thereby causing the system at least in part to perform:

receiving a document;

encrypting the document using a primary key;

receiving a sharing request from a current user of the document for sharing the document with a next user; and for each time the document is to be shared with the next user in a series, performing:

generating a key for the next user specified in the sharing request;

encrypting the document for the next user using the key generated for the corresponding next user;

binding access rights and a sharing path to the document for authorizing the sharing request to access the document by the next user, the sharing path comprising sequence information about one or more next users and one or more intermediate users with whom the document is being shared in the series;

creating one or more compressed paths in the sharing path using a shared path compression technique;

generating one or more keys for the one or more compressed paths;

encrypting the document using each key of the one or more keys generated for a corresponding compressed path of the one or more compressed paths to generate one or more double encrypted documents;

adding access rights and the corresponding compressed path to each double encrypted document;

sharing each double encrypted document with a user specified in the corresponding compressed path;

sharing the encrypted document with the next user;

receiving a request to access the encrypted document from the next user; and providing an access to the encrypted document to the next user.

12. The system as claimed in claim 11, wherein for providing the access to the encrypted document meant for the next user, the system is caused at least in part to:

authorize the request received from the next user to access the encrypted document using the access rights bound to the document; and upon successful authorization, provide the access to the encrypted document to the next user.

13. The system as claimed in claim 12, wherein for providing the access to the encrypted document meant for the next user, the system is further caused at least in part to:

perform one or more decryptions using one or more keys that are generated for one or more next users specified in one or more sharing requests received for the encrypted document;

send a request to access the primary key to recover an un-encrypted document from the encrypted document;

upon granting access to the primary key, use the primary key to recover the un-encrypted document from the encrypted document; and provide the access to the un-encrypted document to the next user, the next user being a current recipient of the document.

14. The system as claimed in claim 13, wherein for providing the access to the un-encrypted document, the system is caused at least in part to:

allow one or more actions on the un-encrypted document based on the access rights bound to the document.

15. The system as claimed in claim 14, wherein the one or more actions comprise:

downloading a copy of the document;

viewing the document; and modifying the document.

16. A system comprising:

an input-output module configured to receive one or more documents to be stored and to facilitate viewing of the one or more documents;

an encryption-decryption management module in communication with the input-output module, the encryption-decryption management module configured to perform encryption and decryption of the one or more documents for facilitating secured sharing of the one or more documents in a series, wherein the encryption-decryption management module comprises:

a key generation unit to generate a new key for each sharing request that is received for sharing a document of the one or more documents in the series;

an access right management unit to manage access rights of each document by authorizing every access request to access the document;

a shared path management unit to create and manage a sharing path to be attached to the document based on one or more sharing requests received for the document, wherein the sharing path comprises sequence information about one or more next users and one or more intermediate users with whom the document is being shared in the series;

a key management unit in communication with the key generation unit and the shared path management unit, to manage use of keys to be performed while performing encryption and decryption of the document being shared;

an encryption unit in communication with the key management unit, to perform the encryption of the document for every sharing request that is received for the document using the new key generated for the corresponding sharing request;

a decryption unit in communication with the key management unit, to perform a plurality of decryptions along the sharing path to provide an un-encrypted original document;

the shared path management unit to create one or more compressed paths in the sharing path using a shared path compression technique;

the key generation unit to generate one or more keys for the one or more compressed paths;

the encryption unit to encrypt the document using each key of the one or more keys generated for a corresponding compressed path of the one or more compressed paths to generate one or more double encrypted documents;

the access right management unit to add access rights and the corresponding compressed path to each double encrypted document, wherein each double encrypted document is shared with a user specified in the corresponding compressed path;

a storage module in communication with the input-output module and the encryption-decryption management module, the storage module configured to store the one or more documents and one or more keys that are used for performing the encryption and the decryption of the one or more documents; and a processing module in communication with the input-output module, the encryption-decryption management module and the storage module, the processing module configured to send operating instructions to the input-output module, the encryption-decryption management module and the storage module for facilitating secured access of the one or more documents stored in the system.

* * * * *